(12) United States Patent
Avasiloaie

(10) Patent No.: US 9,533,655 B2
(45) Date of Patent: Jan. 3, 2017

(54) WIPER COUPLER ADAPTER AND WIPER ASSEMBLY INCORPORATING SAME

(71) Applicant: TRICO PRODUCTS CORPORATION, Rochester Hills, MI (US)

(72) Inventor: Valentin Avasiloaie, Dearborn Heights, MI (US)

(73) Assignee: Trico Products Corporation, Rochester Hills, MI (US)

(*) Notice: Subject to any disclaimer, the term of this patent is extended or adjusted under 35 U.S.C. 154(b) by 122 days.

(21) Appl. No.: 13/693,568

(22) Filed: Dec. 4, 2012

(65) Prior Publication Data

US 2014/0150197 A1    Jun. 5, 2014

(51) Int. Cl.
*B60S 1/38* (2006.01)
*B60S 1/40* (2006.01)

(52) U.S. Cl.
CPC ............ *B60S 1/3801* (2013.01); *B60S 1/4087* (2013.01)

(58) Field of Classification Search
CPC .............................. B60S 1/4087; B60S 1/4083
USPC ............................ 15/250.32, 250.44–250.48, 250.201,15/250.361, 250.43; 248/222.11, 222.12, 73
See application file for complete search history.

(56) References Cited

U.S. PATENT DOCUMENTS

| | | | |
|---|---|---|---|
| 2,264,167 A * | 11/1941 | Paulus | ...................... 15/250.33 |
| 2,589,339 A | 3/1952 | Carson | |
| 2,616,112 A | 11/1952 | Smulski | |
| 2,643,411 A | 6/1953 | Nesson | |
| 2,799,887 A | 7/1957 | Nemic | |
| 2,801,436 A | 8/1957 | Scinta | |
| 2,814,820 A | 12/1957 | Elliott et al. | |
| 2,932,843 A | 4/1960 | Zaiger et al. | |
| 2,937,393 A | 5/1960 | Brueder | |

(Continued)

FOREIGN PATENT DOCUMENTS

| | | |
|---|---|---|
| DE | 1028896 B | 4/1958 |
| DE | 1247161 B | 8/1967 |

(Continued)

OTHER PUBLICATIONS

Mar. 10, 2014 International Search Report and Written Opinion for PCT/US2013/072806.

*Primary Examiner* — Monica Carter
*Assistant Examiner* — Andrew A Horton
(74) *Attorney, Agent, or Firm* — Miller Canfield

(57) ABSTRACT

A wiper coupler adaptor for use in releasably attaching a wiper assembly to a bayonet style wiper arm having an attachment end includes a pair of sidewalls each including a post that extends transversely toward the other to operatively engage structure of a wiper assembly and a deck disposed between the sidewalls that cooperates with a portion of the sidewalls to define a rest adapted to operatively receive the attachment end of the wiper arm. The sidewalls each include a ledge that extends transversely toward the other to operatively engage the attachment end of the wiper arm. The wiper coupler adaptor also includes a locking mechanism including a cantilevered body and a head disposed at a terminal end of the cantilevered body. The head includes a lip depending therefrom that is adapted to extend through an aperture in the base of the attachment end and receive a portion of the base of the attachment end to prevent undesired release of the wiper coupler adaptor from the attachment end of the wiper arm.

18 Claims, 3 Drawing Sheets

(56) References Cited

U.S. PATENT DOCUMENTS

| | | |
|---|---|---|
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,463 A * | 3/1963 | Bock et al. ............... 15/250.32 |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Bianchi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,383,358 A * | 1/1995 | Hamon ............................ 73/273 |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 * | 7/2003 | Jarasson ....................... 403/326 |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,287,296 B2 | 10/2007 | Vacher |
| 7,451,520 B2 | 11/2008 | Weiler et al. |
| 7,523,522 B2 | 4/2009 | Herring et al. |

(56) References Cited

U.S. PATENT DOCUMENTS

| | | |
|---|---|---|
| 7,546,660 B2 | 6/2009 | Heinrich et al. |
| 7,581,279 B2 | 9/2009 | Baseotto et al. |
| 7,621,016 B2 | 11/2009 | Verelst et al. |
| 7,774,892 B2 | 8/2010 | Coughlin |
| 2002/0026681 A1 | 3/2002 | Nacamuli |
| 2003/0159229 A1 | 8/2003 | Weiler et al. |
| 2004/0019997 A1 | 2/2004 | Baseotto et al. |
| 2004/0025281 A1 | 2/2004 | Baseotto et al. |
| 2004/0123414 A1 | 7/2004 | Lee |
| 2005/0082449 A1* | 4/2005 | Kawaguchi et al. .... 248/220.31 |
| 2006/0130263 A1 | 6/2006 | Coughlin |
| 2007/0174989 A1 | 8/2007 | Moll et al. |
| 2008/0066254 A1 | 3/2008 | Vacher |
| 2009/0199357 A1 | 8/2009 | Thienard |
| 2010/0212101 A1 | 8/2010 | Thienard et al. |
| 2011/0047742 A1* | 3/2011 | Kim et al. ................. 15/250.32 |
| 2013/0333144 A1* | 12/2013 | Depondt .................... 15/250.32 |

FOREIGN PATENT DOCUMENTS

| | | | |
|---|---|---|---|
| DE | 1505397 A1 | 10/1969 | |
| DE | 1655410 A1 | 8/1971 | |
| DE | 2311293 A1 | 9/1974 | |
| DE | 2336271 A1 | 2/1975 | |
| DE | 2350302 A1 | 4/1975 | |
| DE | 2353368 A1 | 5/1975 | |
| DE | 2640399 A1 | 3/1977 | |
| DE | 19729865 A1 | 1/1999 | |
| DE | 19734843 A1 | 2/1999 | |
| DE | 19814609 A1 | 10/1999 | |
| DE | 10335393 A1 | 9/2004 | |
| DE | 102010062940 A1 * | 6/2012 | ............... B60S 1/38 |
| EP | 0594451 A1 | 4/1994 | |
| FR | 1069875 A | 2/1954 | |
| FR | 2248175 A1 * | 5/1975 | ............... B60S 1/40 |
| FR | 2377302 A1 | 8/1978 | |
| FR | 2515121 A1 | 4/1983 | |
| GB | 878951 A | 10/1961 | |
| GB | 1012902 A | 12/1965 | |
| GB | 1489791 | 4/1975 | |
| GB | 1395918 A | 5/1975 | |
| GB | 2308542 A | 7/1997 | |
| JP | 2007-331748 A | 12/2007 | |
| KR | 10-2006-0087237 B1 | 8/2006 | |
| WO | 0021809 A1 | 4/2000 | |
| WO | 02087935 A1 | 11/2002 | |
| WO | 03051696 A1 | 6/2003 | |
| WO | 03080409 A1 | 10/2003 | |
| WO | 2004048163 A1 | 6/2004 | |
| WO | 2004076251 A1 | 9/2004 | |
| WO | 2004076252 A1 | 9/2004 | |
| WO | 2005/039944 A1 | 5/2005 | |
| WO | 2006069648 A1 | 7/2006 | |
| WO | 2009133979 A1 | 11/2009 | |
| WO | 2011131395 A2 | 10/2011 | |

\* cited by examiner

WIPER COUPLER ADAPTER AND WIPER ASSEMBLY INCORPORATING SAME

BACKGROUND OF THE INVENTION

1. Field of the Invention

The present invention relates generally to wiper assemblies and more specifically, to a wiper coupler adaptor and wiper assembly incorporating same for use in connecting the wiper assembly to a wiper arm of a vehicle.

2. Description of the Related Art

Conventional wiper systems known in the related art include some type of wiper assembly mounted to a wiper arm which, in turn, is mounted adjacent a windshield of a vehicle and pivotally driven to impart reciprocating motion to the wiper assembly across the windshield. The wiper assembly includes a rubber wiping element that contacts the windshield across the surface to be wiped. Generally, the wiper assembly may be classified into one of two categories commonly referred to as "tournament-style" wiper assemblies and "beam-blade style" wiper assemblies.

Some wiper systems include wiper arms of a bayonet style. The wiper arm has an elongate body with a pivot end operatively attached to an electrical motor to move the wiper arm across the surface to be wiped in an oscillating manner. The wiper arm also has an attachment end of a bayonet style at the other end of the elongate body. The attachment end includes a base and bent tab extending linearly outward from the base. The attachment end also includes an aperture spaced longitudinally from the bent tab and extending through the base.

It is known to provide a wiper coupler or adaptor to connect the wiper assembly to a bayonet style wiper arm. Such a wiper coupler is disclosed in U.S. Pat. No. 7,287,296. While this type of wiper coupler is used for its intended purpose, the wiper coupler is not retained sufficiently to the bayonet style wiper arm. Also, such a wiper coupler is relatively difficult to install on a bayonet style wiper arm.

Accordingly, there is a need in the art for a new wiper coupler adaptor that operatively attaches a wiper assembly to a bayonet style wiper arm. Further, there is a need in the art for a wiper coupler adaptor that has good retention and is easy to install, on a bayonet style wiper arm. In addition, there is a need in the art for a wiper coupler adaptor that operatively engages a bayonet style wiper arm designed for a wiper assembly incorporating same having a replaceable wiping element.

SUMMARY OF INVENTION

The present invention overcomes many limitations and disadvantages in the related art in a wiper coupler adaptor, as well as a wiper assembly, for use in connection with a bayonet style wiper arm. According to this embodiment a wiper coupler adaptor releasably attaches a wiper assembly to a bayonet style wiper arm having an attachment end. The wiper coupler adaptor includes a pair of sidewalls each, including a post that extends transversely toward the other to operatively engage structure of a wiper assembly and a deck disposed between the sidewalls that cooperates with a portion of the sidewalls to define a rest adapted to operatively receive the attachment end of the wiper arm. The sidewalls each include a ledge that extends transversely toward the other to operatively engage the attachment end of the wiper arm. The wiper coupler adaptor also includes a locking mechanism including a cantilevered body and a head disposed at a terminal end of the cantilevered body. The head includes a lip depending therefrom that is adapted to extend through an aperture of the attachment end and receive a portion of the attachment end to prevent undesired release of the wiper coupler adaptor from the attachment end of the wiper arm.

Thus, one advantage of the present invention is that a wiper coupler adaptor operatively couples a wiper assembly to a bayonet style wiper arm. Another advantage of the present invention is that the wiper coupler adaptor provides a locking mechanism to secure the wiper assembly to a bayonet style wiper arm. Yet another advantage of the present invention is that a wiper assembly incorporates a wiper coupler adaptor with good arm front retention for current bayonet style wiper arms. Still another advantage of the present invention is that a wiper assembly incorporates a wiper coupler adaptor for the aftermarket fit of current bayonet style wiper arms with a replaceable wiping element to be replaced by readily available wiping elements to simplify the task associated with replacing a wiper assembly.

Other objects, features, and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
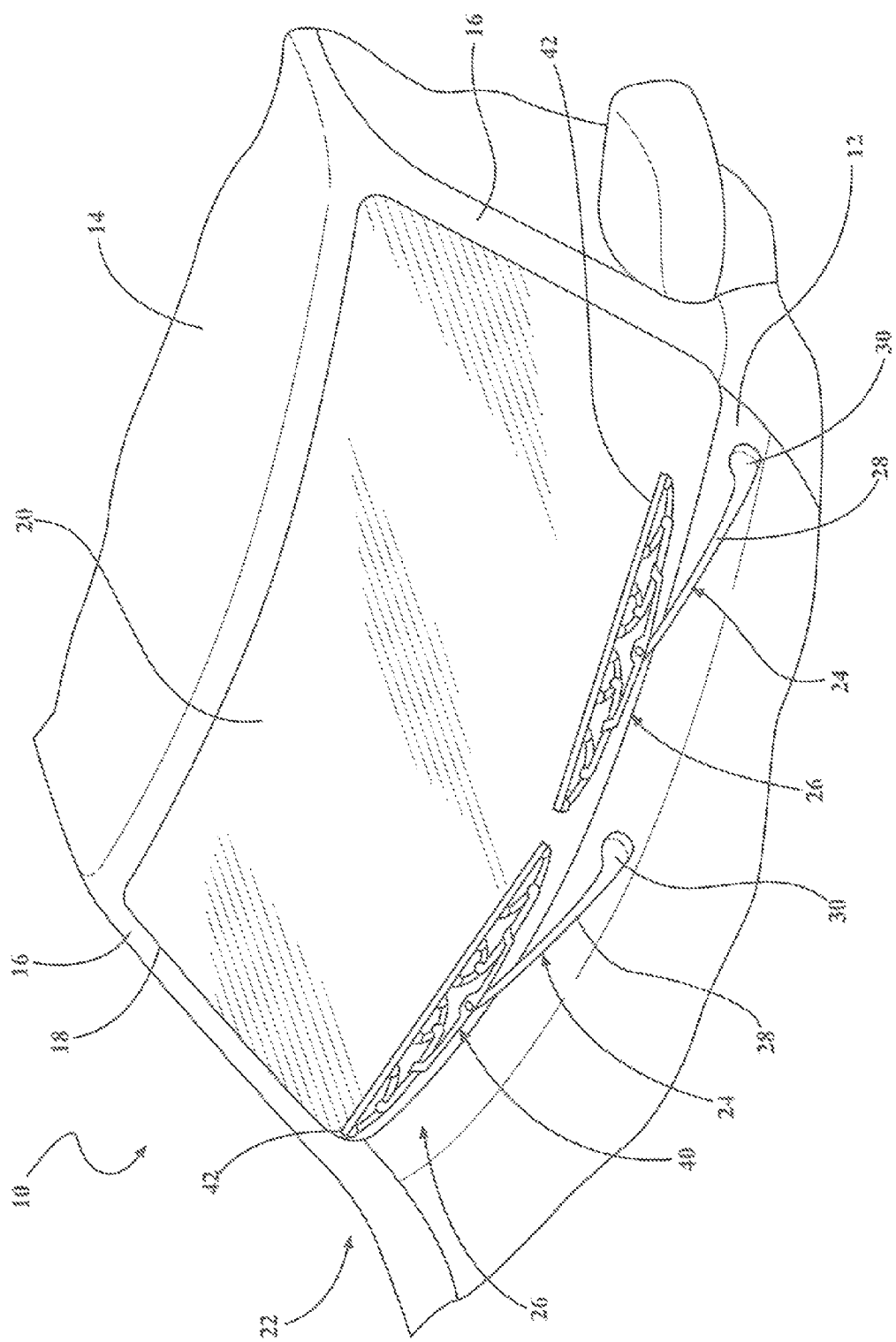
FIG. 1 is a partial perspective view of a front of a vehicle having a wiper system, with a pair of wiper assemblies pivotally mounted to wiper arms for reciprocal movement across a windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20.

A wiper system, is generally indicated at 22 in FIG. 1 and is employed to clean the glass windshield 20. The wiper system 22 includes a wiper arm, generally indicated at 24, and a wiper assembly, generally indicated at 26. Those having ordinary skill in the art will appreciate that a wiper system 22 may include more than one wiper arm 24 and more than one wiper assembly 26. By way of example and as indicated in FIG. 1, a wiper system 22 may include a pair of wiper arms 24 and wiper assemblies 26, which correspond to the driver and passenger side of the vehicle 10.

Figure 2:
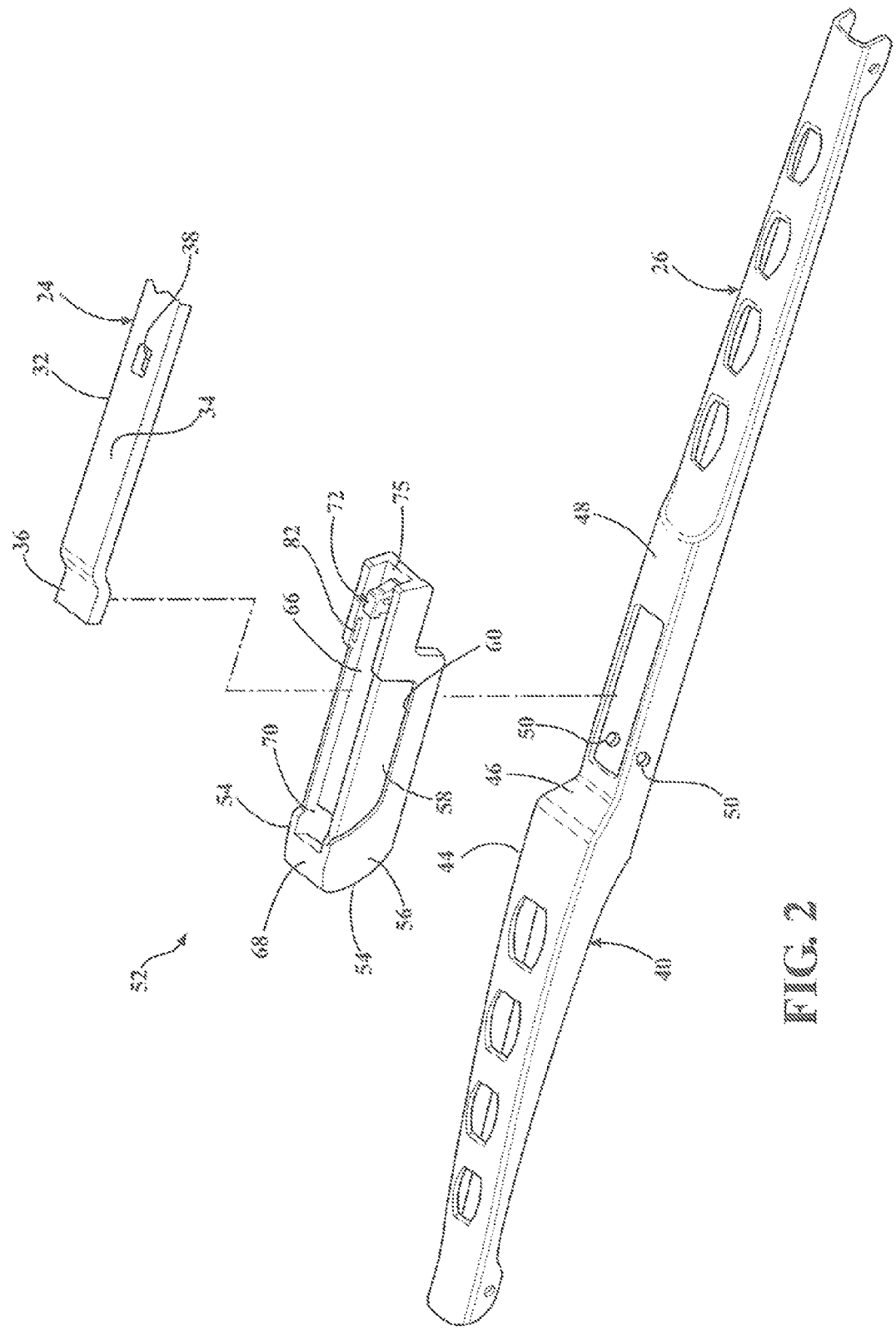
FIG. 2 is an exploded perspective view of a wiper coupler adaptor, according to one embodiment of the present invention, illustrated with a portion of the wiper assembly and wiper arm of FIG. 1.
Figure 3:
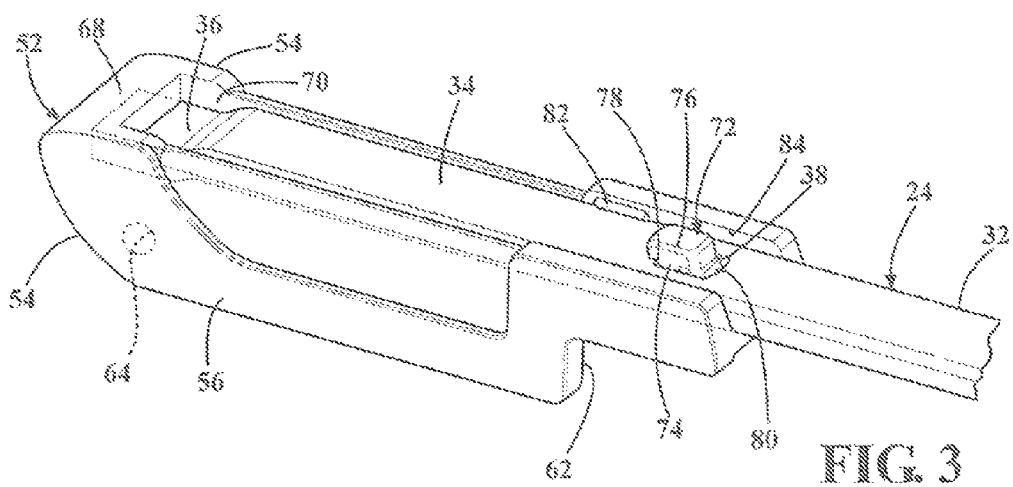
FIG. 3 is a perspective view of the wiper coupler adaptor in accordance with the embodiment in FIG. 2 illustrated in an assembled position with the wiper arm.
Figure 4:
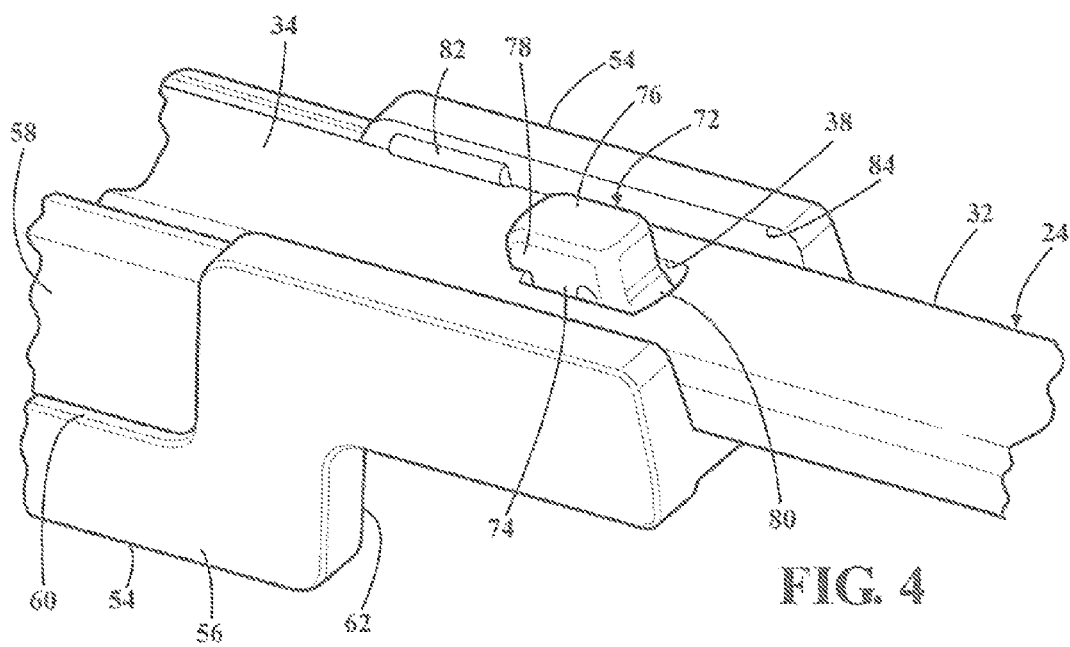
FIG. 4 is an enlarged perspective view of a portion of the wiper coupler adaptor and wiper arm illustrated in FIG. 3.
Figure 5:
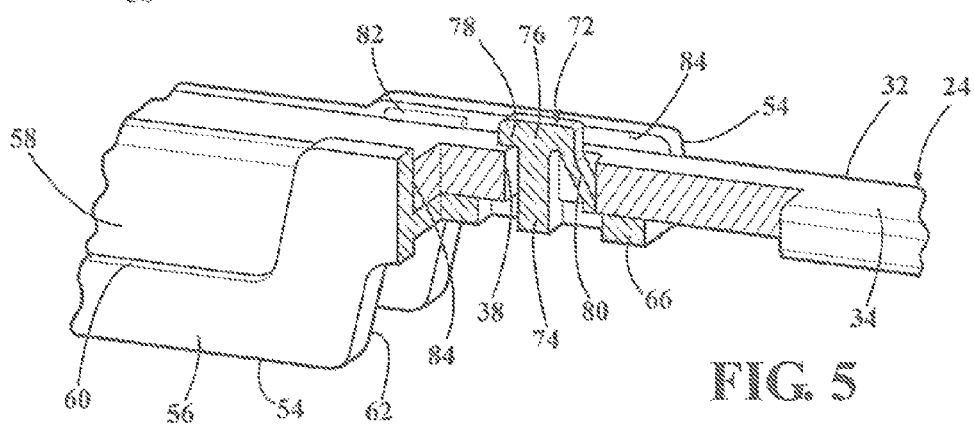
FIG. 5 is a fragmentary perspective view of a portion of the wiper coupler adaptor and wiper arm illustrated in FIG. 3.

Referring to FIGS. 1 and 2, the wiper arm 24 includes an elongate body 28 with a pivot end 30 operatively attached to an electrical motor (not shown) to move the wiper arm 24 across the surface to be wiped in an oscillating manner. The wiper arm 24 further includes an attachment end 32 of a bayonet style, described in greater detail below, at the other end of the elongate body 28. The elongate body 28 includes a predetermined length to direct the wiper assembly 26 across the appropriate surface area. Accordingly, it will be appreciated that the predetermined length of the elongate body 28 will vary depending on the surface area to be wiped. Furthermore, those having ordinary skill in the art will appreciate that the elongate body 28 may be jointed for movement away from the surface to be wiped in order to facilitate replacement of the wiper assembly 26 when worn or to perform other maintenance or repair to the wiper system 22 or adjacent area of the vehicle 10. In addition to these elements, the wiper arm 24 may further include a biasing member (not shown), such as a spring, to provide a biasing force that facilitates contact between the wiper assembly 26 and the windshield 20 of the vehicle 10.

Referring to FIG. 2, the wiper arm 24 further includes an attachment end, generally indicated at 32, disposed at or adjacent to the end of the elongate body 28, opposite the pivot end 30. The attachment end 32 is adapted to operatively engage the wiper assembly 26, as will be described in greater detail below. The attachment end 32 includes a base 34 and bent tub 36 extending linearly outward from the base 32. The attachment end 32 also includes an aperture 38 spaced longitudinally from the bent tab 36 and extending through the base 34. It should be appreciated that the attachment end 32 of the wiper arm 24 is conventional and known in the art. It should also be appreciated that the wiper arm 24 having the bayonet style attachment end 32 described above is commonly employed for connection with a specific type of wiper assembly and does not form part of this invention. It should further be appreciated that the present invention is a wiper coupler adaptor 52 and wiper assembly 26, described in greater detail below, that operatively attaches to the bayonet style attachment end 32 of the wiper arm 24.

As illustrated in FIGS. 1 and 2, the wiper assembly 26 includes a structure, generally indicated at 40, and a wiping element 42 operatively supported by the structure 40. The wiping element 42 may be constructed from any suitable material that imparts a flexible quality when cured, such as rubber, silicone, or a polymer. It should be appreciated that the wiping element 42 is known in the art.

Referring to FIG. 2, the structure 40 includes a body 44 having an asymmetrical side profile. More specifically, the body 44 includes a step-down area 46 to receive a wiper coupler adaptor 52, described in greater detail below, and a low profile section 48 adjacent the step-down area 46. The low profile section 46 reduces the likelihood of interference with the wiper arm 24 during operation, and further reduces the likelihood of wind lift during operation. The structure 40 further includes a pair of aligned bores 50 adjacent the step down area 46 to operatively engage a wiper coupler adaptor 52, as will be described in greater detail below.

Referring to FIGS. 2 through 5, the wiper assembly 26 further includes a wiper coupler or adaptor, generally indicated at 52. The wiper coupler adaptor 52 is operatively mounted to the structure 40 and is employed for connecting the wiper assembly 26 to the wiper arm 24. Specifically, the wiper coupler adaptor 52 releasably connects the structure 40 to the attachment end 32 of the wiper arm 24. The wiper coupler adaptor 52 includes a pair of sidewalls 54 extending longitudinally. Each of the sidewalls 54 defines a surface 56 disposed generally opposed relative to the other. The opposed surfaces 56 include a recessed section 58 partially defined within the opposed surfaces 56 by a lip 60.

As illustrated, each of the sidewalls 54 further includes an interior surface 62 facing each other. The interior surfaces 62 are adapted to operatively engage the body 44 of the structure 40. The interior surfaces 62 include posts 64 that extend transversely from their respective interior surface 62 and toward each other. The posts 64 operatively engage the aligned bores 50 of the body 44 and provide a hearing surface about which the structure 40 may pivot relative to the wiper coupler adaptor 52. The interior surfaces 62 may include at least one support rib (not shown) to provide interference fit between the sidewalls 54 and the body 44 as well as increase the structural integrity of the sidewalls 54.

Referring to FIGS. 2 through 5, the wiper coupler adaptor 52 further includes a deck 66 disposed between the sidewalls 54. The deck 66 is recessed or disposed below a top of the sidewalls 54 and cooperates with the sidewalls 54 to define a recess or rest that is adapted to operatively receive the base 34 of the attachment end 32. The wiper coupler adaptor 52 further includes an elevated platform 68 disposed between the sidewalls 54 at a forward longitudinal end thereof that cooperates with the sidewalls 54 and the deck 66 to define an aperture 70 therebetween. It should be appreciated that the elevated platform 68 additionally provides structural support between the sidewalls 74.

The wiper coupler adaptor 52 also includes a locking mechanism, generally indicated at 72, to releasably lock to the attachment end 32 of the wiper arm 24. The locking mechanism 72 includes a cantilevered body 74 that is disposed between the sidewalls 54 and extends upward from the deck 66 near a distal end 75 of the deck 66. The locking mechanism 72 also includes a head 76 at a free or terminal end of the cantilevered body 74. The head 16 includes a lip 78 extending longitudinally forward therefrom that is adapted to extend through an aperture 38 in the base 36 of the attachment end 32 and overlap a portion of the base 34 of the attachment end 32 to prevent undesired release of the wiper coupler adaptor 52 from the attachment end 32 of the wiper arm 24. The head 76 and the cantilevered body 74 form a generally "T" shaped member. The locking mechanism 72 further includes a cantilevered member 80 extending downwardly and outwardly rearwardly from the head 76 to provide a biasing force to bias the lip 78 forward to overlap a portion of the base 34 of the attachment end 32. The cantilevered body 74, head 76, and deck 66 are integral, unitary, and one-piece.

Referring to FIGS. 2 through 5, the wiper coupler adaptor 52 also includes a ledge 82 on each sidewall 54 that extends from an interior surface 84 thereof transversely toward the other to operatively engage the base 34 of the attachment end 32 of the wiper arm 24. The ledge 82 is disposed forward of the locking mechanism 72. The ledge 82 extends longitudinally a predetermined distance. The ledge 82 is disposed below a height of the head 76 of the locking mechanism 72. The sidewalls 54 and the ledges 82 are integral, unitary, and one-piece. It should also be appreciated that the wiper coupler adaptor 52 is made from a plastic material and is integral, unitary, and one-piece.

The embodiment of the wiper assembly 26 of the present invention illustrated in FIGS. 2 through 5 is properly assembled when the wiper coupler adaptor 52 is seated adjacent the step-down 46 of the body 44 of the structure 40 and the aligned posts 64 operatively engage the aligned bores 50. The embodiment of the wiper assembly 26 is properly attached to the wiper arm 24 by inserting the bent tab 36 within the aperture 70 and rotating the wiper assembly 26 such that the bent tab 36 contacts the elevated platform 68 and the locking mechanism 72 extends through the aperture 38 in the base 34 and the lip 78 overlaps the base 34 due to the biasing force of the cantilevered member 80. Proper attachment of the wiper assembly 26 is further achieved when the base 34 of the attachment end 32 is seated on the deck 66 and ledges 82 overlap the base 36.

On the other hand, replacement of the wiper assembly of the present invention illustrated in FIGS. 2 through 5 is accomplished by applying force to the cantilevered member 80 in a direction toward the elevated platform 68, thereby disengaging the locking mechanism 72 from contact with the base 36 and rotating the wiper assembly 26 such that the bent tab 36 moves away from the elevated platform 68. Removal of the wiper assembly 26 from the wiper arm 24 is achieved when the bent tab 36 disengages from the aperture 70 of the wiper coupler adaptor 52.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper coupler adaptor for use in releasably attaching a wiper assembly to a bayonet style wiper arm having an attachment end, said wiper coupler adaptor comprising:
   a pair of sidewalls each including a post that extends transversely toward the other to operatively engage the wiper assembly;
   a deck disposed between said sidewalls that cooperates with a portion of said sidewalls to define a rest adapted to operatively receive the attachment end of the wiper arm;
   said sidewalls each including a ledge that extends from each of said sidewalls transversely toward the other to operatively engage the attachment end of the wiper arm; and
   a locking mechanism including a cantilevered body and a head disposed at a terminal end of said cantilevered body, said head including a lip extending therefrom that is adapted to extend through an aperture of the attachment end and overlap a portion of the attachment end to prevent undesired release of said wiper coupler adaptor from the attachment end of the wiper arm, said locking mechanism further including a cantilevered member extending downwardly and outwardly rearwardly from said head to provide a biasing force to bias the lip forward to overlap a portion of the attachment member when said cantilevered member is disposed in the aperture.

2. A wiper coupler adaptor as set forth in claim 1 wherein said lip extends longitudinally forward from said head.

3. A wiper coupler adaptor as set forth in claim 1 wherein said head and said cantilevered body form a generally "T" shaped member.

4. A wiper coupler adaptor as set forth in claim 1 wherein said ledge is disposed forward of said locking mechanism.

5. A wiper coupler adaptor as set forth in claim 1 wherein said ledge extends longitudinally a predetermined distance.

6. A wiper coupler adaptor as set forth in claim 1 wherein said ledge is disposed below a height of said head.

7. A wiper coupler adaptor as set forth in claim 1 wherein said deck is disposed below a height of said sidewalls to form a recess for the attachment end.

8. A wiper coupler adaptor as set forth in claim 1 wherein said sidewalls and said ledge are integral, unitary, and one-piece.

9. A wiper coupler adaptor as set forth in claim 1 wherein said cantilevered body, said head, and said deck are integral, unitary, and one-piece.

10. A wiper assembly for use in connection with a bayonet style wiper arm, said wiper assembly comprising:
    a wiping element adapted to contact a surface to be wiped;
    a structure supporting said wiping element; and
    a wiper coupler adaptor operatively mounted to said structure that is adapted to releasably attach to an attachment end of the wiper arm, said wiper coupler adaptor including a pair of sidewalls and a deck disposed therebetween that is adapted to operatively engage a portion of the attachment end of the wiper arm, said deck and a portion of said sidewalls cooperating to define a rest adapted to operatively receive the attachment end, said sidewalls each including a ledge that extends from each of said sidewalls transversely toward the other to operatively engage the attachment end of the wiper arm, and a locking mechanism including a cantilevered body and a head disposed at a terminal end of said cantilevered body, said head including a lip extending therefrom that is adapted to extend through an aperture in the attachment end and overlap a portion of the attachment end to prevent undesired release of said wiper coupler adaptor from the attachment end of the wiper arm, said locking mechanism further including a cantilevered member extending downwardly and outwardly rearwardly from said head to provide a biasing force to bias the lip forward to overlap a portion of the attachment member when said cantilevered member is disposed in the aperture.

11. A wiper assembly as set forth in claim 10 wherein said head extends longitudinally forward from said cantilevered body.

12. A wiper assembly as set forth in claim 10 wherein said head and said cantilevered body form a generally "T" shaped member.

13. A wiper assembly as set forth in claim 10 wherein said ledge is disposed forward of said locking mechanism.

14. A wiper assembly as set forth in claim 10 wherein said ledge extends longitudinally a predetermined distance.

15. A wiper assembly as set forth in claim 10 wherein said ledge is disposed below a height of said head.

16. A wiper assembly as set forth in claim 10 wherein said cantilevered body, said head, and said deck are integral, unitary, and one-piece.

17. A wiper assembly as set forth in claim 16 wherein said sidewalls and said ledge are integral, unitary, and one-piece.

18. A wiper assembly for use in connection with a bayonet style wiper arm, said wiper assembly comprising:
    a wiping element adapted to contact a surface to be wiped;
    a structure supporting said wiping element;
    a wiper coupler adaptor operatively mounted to said structure that is adapted to releasably attach to an attachment end of the wiper arm, said wiper coupler adaptor including a pair of sidewalls and a deck disposed therebetween that is adapted to operatively engage a portion of the attachment end of the wiper arm, said deck and a portion of said sidewalls cooperating to define a rest adapted to operatively receive the attachment end, said sidewalls each including a ledge that extends from said sidewalls transversely toward the other to operatively engage the attachment end of the wiper arm, and a locking mechanism including a cantilevered body and a head disposed at a terminal end of said cantilevered body, said head extending longitudinally forward from said cantilevered body including a lip extending therefrom that is adapted to extend through an aperture in the attachment end and overlap a portion of the attachment end and a cantilevered member extending downwardly and outwardly from said head to prevent undesired release of said wiper coupler adaptor from the attachment end of the wiper arm, said locking mechanism further including a cantilevered member extending downwardly and outwardly rearwardly from said head to provide a biasing force to bias the lip forward to overlap a portion of the attachment member when said cantilevered member is disposed in the aperture; and wherein said ledge is disposed forward of said locking mechanism and below a height of said head.

* * * * *